April 14, 1959 W. G. GIBSON ET AL 2,882,335
COLOR TELEVISION PICKUP SYSTEM
Filed Aug. 25, 1954
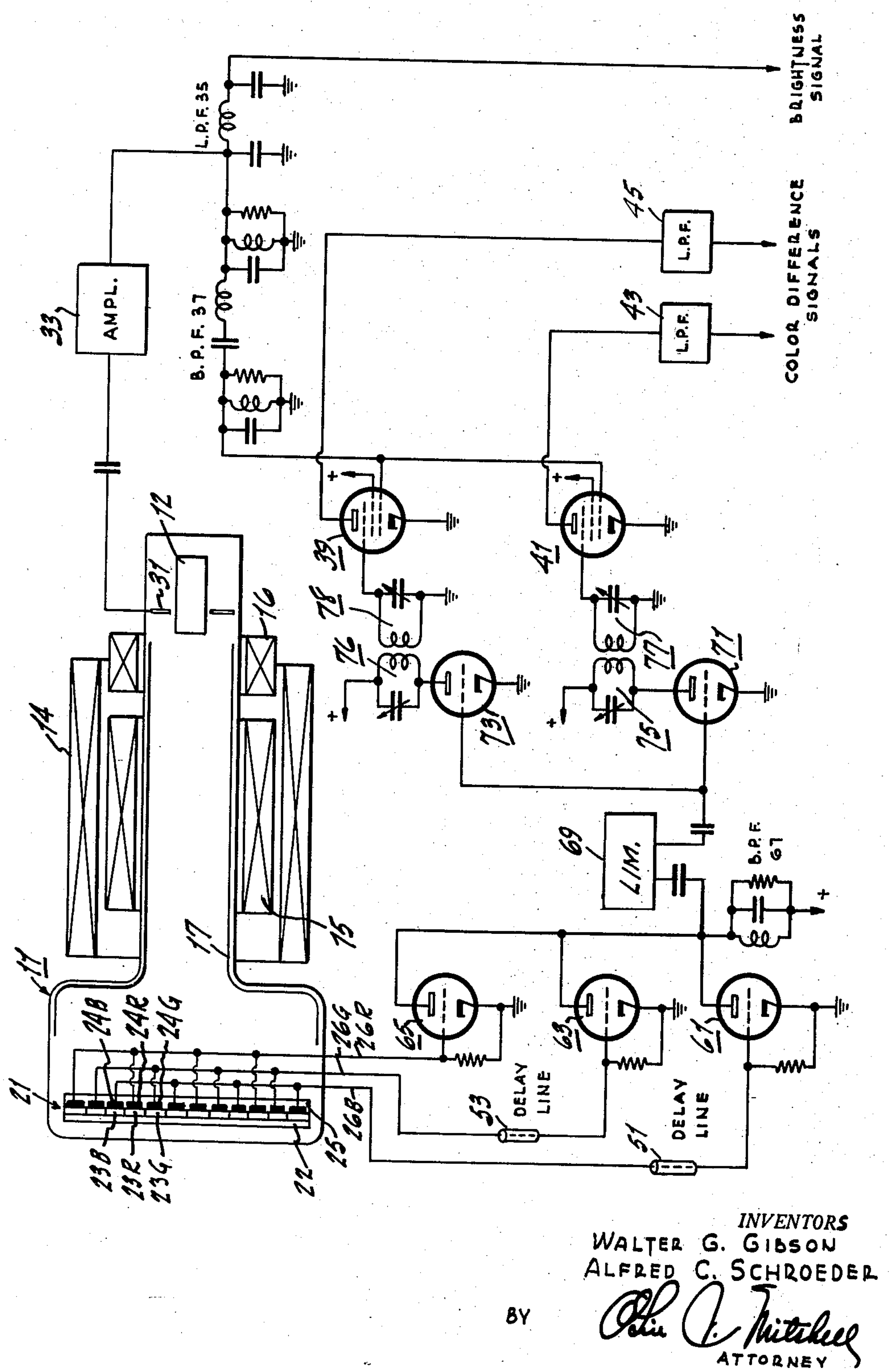
INVENTORS
WALTER G. GIBSON
ALFRED C. SCHROEDER
BY
ATTORNEY 2,882,335

COLOR TELEVISION PICKUP SYSTEM

Walter G. Gibson, Princeton, N.J., and Alfred C. Schroeder, Huntingdon Valley, Pa., assignors to Radio Corporation of America, a corporation of Delaware Application August 25, 1954, Serial No. 452,055

6 Claims. (Cl. 178—5.4)

The present invention relates generally to color television pickup systems, and more particularly to color television pickup systems of the type utilizing a single color pickup tube to derive a plurality of simultaneous color signals.

A simultaneous color pickup tube has been proposed utilizing interleaved signal strips. A tube of this type may include a target structure comprising a glass base; a plurality of interleaved red, green and blue pass filter strips deposited thereon and arranged in a predetermined color sequence; a plurality of optically transparent, electrically conductive signal strips laid down on the filter strips such that each signal strip is super-imposed upon a predetermined one of the filter strips; a continuous layer of photo-conductive material, such as porous antimony sulphide deposited over the conductive strips; and respective "red," "blue" and "green" bus bars connected to the appropriate ones of said conductive strips.

The present invention is concerned with color television pickup systems utilizing a pickup tube of the interleaved signal strip variety, such as those described above, but involves a novel system of utilization of such variety of tubes wherein the interleaved signal strips are utilized only to derive a reference signal or sampling wave. Color information is obtained from the pickup tube beam after its return from discharge of the target. "Sampling" of the composite return beam signal to obtain respective color signals therefrom is carried out, using the reference frequency signal or sampling wave obtained from the target signal strips.

In accordance with an embodiment of the present invention, the reference frequency signal utilized for separating color signals from the composite return beam signal of the pickup tube is obtained by suitably combining the signal impulses developed in each target output lead in such a manner that time coincidence of the separately derived impulses is achieved. Presence of a reference signal is thus insured, even if one or two of the respective component colors do not exist in the scene being televised. In accordance with a particular embodiment of the invention, the aforementioned separation of color signals from the composite return beam signal using the reference signal derived from the target signal strips is carried out in such a manner as to provide signal outputs in color difference form suitable for application to the modulators of a simultaneous subcarrier color television transmission system, such as a system in accordance with the color broadcast standards approved by the Federal Communications Commission.

It is a primary object of the present invention to provide a novel and improved simultaneous color television pickup system.

It is a further object of the present invention to provide a novel and improved color television pickup system in which a plurality of simultaneous color signals may be derived from a single pickup device.

It is an additional object of the present invention to provide a simultaneous color television pickup system involving novel utilization of a color pickup tube of the interleaved signal strip variety.

Other objects and advantages of the present invention will be more readily apparent after a reading of the following detailed description and an inspection of the accompanying drawing which illustrates by block and circuit diagram a color television pickup system utilizing a color pickup tube of the interleaved signal strip variety in accordance with an embodiment of the present invention.

Referring to the drawing in greater detail, the image scanning device 11 illustrated is a color pickup tube of the aforementioned interleaved signal strip variety, and in particular includes a target structure 21 of the photoconductive type previously described. The glass base is denoted by reference numeral 22. The interleaved red, green and blue pass optical filter strips 23R, 23G and 23B are associated respectively with signal strips 24R, 24G and 24B. Photoconductive layer 25 is located on the rear of target structure 21. Bus bars or output leads 26R, 26G and 26B serve to conduct signal information from the target structure 21 to the circuitry associated with the pickup tube 11. Conventional pickup tube elements and associated components are provided for pickup tube 11; an electron gun 12 develops an electron scanning beam. Final anode 17 may take the usual form of a conductive coating on the interior surface of the pickup tube envelope. Deflection yoke 15 when suitably energized causes the electron beam developed by gun 12 to trace a scanning raster on the target 21, the scanning raster being oriented with respect to the strip structure of the target 21 such that each scanning line intersects a plurality of the strips, e.g. the scanning lines are disposed substantially perpendicular to the target strips. Focus coil 14 provides the appropriate magnetic field to focus the scanning electron beam at the target 21. An alignment coil 16 is also illustrated.

The pickup tube 11 also includes a suitable return beam collector 31. The return beam collector assembly may be, for example, of the electron multiplier type utilized in such well-known pickup devices as the image orthicon.

During operation, suitable operating potentials are supplied to the various pickup tube electrodes, focus coil 14 and deflection yoke 15 are appropriately energized. The charge pattern built up on the photoconductive layer 25 in response to light from the scene being televised passing through the color selective filter strips 23 is discharged in an orderly scanning sequence as the electron beam from gun 12 traces a scanning raster on the target structure 21.

The signal derived from the return beam collector 31 is a composite signal including video frequency signal components representative of the brightness of the scene, and a modulated carrier bearing component color signal information, the carrier being generated due to the discontinuous distribution of information concerning each component color signal along the paths traced by the scanning beam. The frequency of the carrier obtained from collector 31 is determined by the rate of traversal of the scanning beam across the "strip" structure of the target. By synchronous detection of the modulated carrier at respectively appropriate phases, information concerning the different component color aspects of the scene can be separately obtained. As noted previously, in accordance with the principles of the present invention, the reference frequency signal or sampling wave required to effect the synchronous detection of the modulated carrier at the desired phases is obtained from the signal strips 24, as will be explained in detail subsequently.

The return beam signal output derived from collector 31 is amplified in an appropriate camera preamplifier 33, having suitably wide frequency band response. The desired brightness video signals are obtained from the return beam signal by application of the output of amplifier 33 to a low pass filter 35, which may have a cutoff frequency of approximately 4.5 mc. The fineness of the strip structure of target 21 is preferably chosen so that the frequency of the modulated carrier generated by the traversal of the scanning beam thereover falls above the frequency band desired for the brightness signals.

The output of amplifier 33 is also applied to a bandpass filter 37, having a passband centered about the aforementioned carrier frequency. The passband of filter 37 is chosen to permit passage of the carrier frequency and its upper and lower sidebands to a limit determined by the degree of detail required for the color signals. As an example, the passband of filter 37 may extend between a megacycle above and a megacycle below the carrier frequency.

Detection of the modulated carrier passed by filter 37 to obtain the desired simultaneous color signals is effected by demodulators or samples 39 and 41. The demodulators 39 and 41 each comprise a pentode receiving the modulated carrier output of filter 37 on its first grid. Reference frequency signals of a respectively appropriate phase are applied to the third grid of each pentode. Difference frequency modulation products are selected from the output signal appearing at the plate of each pentode by respective low-pass filters 43 and 45. The respective outputs thereof comprise simultaneous signals representative of different color aspects of the original scene. By appropriate choice of the phase of the reference signal applied to the respective demodulators 39 and 41, these outputs may comprise, for example, red and blue color difference signals, $R-Y$ and $B-Y$.

As noted previously, the reference signals utilized in the carrier demodulation operations are obtained from the signal strips 24 of the target structure 21. Such derivation is effected in the following manner. As the scanning beam of the pickup tube 11 traverses the target structure 21, signals are successively supplied to signal strips of the respective interleaved sets in repeating sequence. Thus, for example, as the scanning beam impinges upon a portion of the photoconductive layer 25 in back of a "red" signal strip 24R an electrical impulse is supplied to the red output lead 26R in response to the discharge of this portion of the target. As the scanning beam moves on to impinge upon a portion of the photoconductive layer in back of a blue signal strip 24B, an electrical impulse is supplied to the blue output lead 26B in response to the discharge of that portion of the target. Similarly, as the scanning beam moves on to impinge upon a portion of the photoconductive layer in back of a green signal strip 24G, an electrical impulse is supplied the green output lead 26G in response to the discharge of the latter portion of the target. While the components of the respective impulses appearing in the output leads 26R, 26B and 26G may differ in accordance with the differences in intensity of the respective component color light represented thereby, these impulses will occur in an orderly sequence in time, assuming that the beam is sufficiently well focused to resolve the strip structure.

The periods of occurrence of impulses in the red output lead 26R, for example, are indicative of the periods when the amplitude of the carrier obtained from the return beam collector 35 is representative of the red component of the scene being televised; or in other words, the output signal appearing in the red output lead 26R represents a signal having a fundamental frequency corresponding to the carrier frequency and having a phase suitable for detection of the red component of the modulation of the carrier output of filter 37. However, by appropriately shifting in phase the signal outputs appearing in either of the other target output leads, a signal having a fundamental frequency corresponding to the carrier frequency and having a phase suitable for detection of the red component of modulation of the carrier output of filter 37 can also be obtained. Rather than use the signal output appearing in but one target output lead as a reference signal source, however, the present invention proposes to utilize a suitable combination of the signals from each of the target output leads as the reference signal source, whereby the presence of a reference signal for demodulation purposes is always assured irrespective of the color content of the scene.

As illustrated, the aforesaid combination of the respective impulses appearing in the target output leads 26 is effected in a relatively narrow band network including respective amplifiers 61, 63 and 65, having a common output circuit which includes a bandpass filter 67. The passband of filter 67 is centered about the nominal carrier frequency generated by the traversal of the target strip structure by the pickup tube scanning beam, and is preferably relatively narrow band to essentially permit passage to subsequent utilization apparatus of only the fundamental frequency of the combined impulses. The passband will, however, preferably be given sufficient width to allow for slight shifts in the carrier frequency due to scanning nonlinearities. In the combining network, the impulses appearing in the red target output lead 26R are applied directly to the input of the amplifier 65, while the impulses appearing in the blue and green target output leads 26B and 26G are applied via respective delay lines 51 and 52 to the respectively associated amplifiers 61 and 63. The delay imparted by delay line 53 is chosen with respect to the positioning of the green target strips relative to the red target strips and with respect to the nominal rate of traversal of the target strips such that the impulses appearing in the green target output lead are delayed so as to coincide in time occurrence with the red impulses applied directly to an amplifier 65. The delay imparted by delay line 51 is chosen on a similar basis to align the time occurrence of blue impulses with the red impulses and the aforementioned delayed green impulses.

As a result of the combination of the respective output impulses in the aforesaid manner, a reference signal or sampling wave is developed which is particularly indicative of the periods of traversal of the red target areas, i.e. is phased so as to represent the "red phase" of the generated carrier. It will be appreciated that absence of a red component in any portion of scene imaged on the pickup tube target will not prevent loss of the "red phase" reference signal during scanning of the corresponding portion of the target, since this signal is derived not from the red output impulses alone, but rather from a combination of red, green and blue output impulses.

The reference signal developed in the aforesaid combining operation is applied, via a limiter 69 provided to render the amplitude of the reference signal essentially constant, to the inputs of a pair of amplifiers 71 and 73, each having a respective tank circuit (75, 76) in its plate circuit, tuned in the vicinity of the nominal carrier frequency. Inductively coupled to the respective tank circuits 75 and 76 are similarly tuned additional tank circuits 77 and 78, respectively. The reference signal appearing across the secondary tank circuit 77 is applied to the third grid of the pentode demodulator 41, while the reference signal appearing across the secondary tank circuit 78 is applied to the third grid of the pentode demodulator 39. As will be noted, the tank circuits 75, 76, 77 and 78 are each provided with a variable capacitor for phasing adjustments of the delivered reference signals. It will be readily appreciated that by appropriate adjustments of these tuning capacitors in the respective tank circuit pairs, 76—78 and 75—77, the phasing of the reference signal applied to the respective demodulators 39 and 41 may be adjusted to provide for demodulation of the carrier output of filter 37 at any desired phase angle. Reference may be made, for example, to the universal resonance curves shown and discussed in Section 3 entitled "Circuit Theory," of the Radio Engineers Handbook, by F. E. Terman, published by the McGraw-Hill Book Company in 1943, to ascertain the degree of off-tuning of the tank circuits required to achieve a desired phase shift of the reference signal applied thereto. If, as indicated previously in an illustrative example, the outputs desired from demodulators 39 and 41 are red and blue color-difference signals, the aforementioned tuning capacitors are adjusted to provide the respective "red" and "blue" phases of the reference signal appropriate to recovery of red information and blue information from the modulated carrier.

It will be appreciated that the foregoing description pertains to an illustrative embodiment of the present invention, and various modifications of and the substitutions for the specific elements described may be made without departing from the principles of the present invention. Thus, for example, while an interleaved signal strip pickup tube target of the photoconductive type has been illustrated and particularly described as the source of the reference signal, it will be appreciated that other forms of pickup tube targets, such as the target described in the U.S. Patent No. 2,446,249 of A. C. Schroeder dated August 3, 1948, are also appropriate to use in the pickup tube 11.

Having thus described the invention, what is claimed is:

1. A color television pickup system comprising in combination, a color pickup tube including a light responsive target, means for developing an electron beam, means for causing said beam to trace a scanning raster on said target, and a collector for electrons of said beam returning from said target, said target having a light responsive segmented surface, means for causing respective interleaved segments of said surface to selectively respond to light of respectively different selected component colors, said different selectively responsive surface segments being interleaved in a predetermined recurring sequence and a plurality of sets of interleaved conducting signal strips, each of said signal strip sets being selectively responsive to signals generated by the scanning of the surface segments of a predetermined component color response; means for deriving a composite signal from said return beam collector; means coupled to said signal strip sets for combining the signals appearing in each of said strip sets to obtain a reference signal; and means coupled to said signal combining means for utilizing said reference signals to derive respective component color informative signals from said composite signal.

2. A color television pickup system comprising in combination a color pickup device including means for developing a scanning beam of electrons, a target structure for said scanning beam including a plurality of interleaved sets of conducting strips, and a collector for electrons of said beam returning from said target; means for deriving a composite signal including a brightness signal and a modulated carrier from said collector; means coupled to said strip sets for combining the signals generated in each strip set in response to the scanning of said target to develop a reference signal having the frequency of said carrier; a synchronous demodulator; and means for applying said composite signal and said reference signal to said demodulator to effect demodulation of said carrier.

3. A color television pickup system comprising in combination a color pickup tube including means for developing a scanning beam of electrons, a target structure for said scanning beam comprising a plurality of interleaved sets of optical filter strips having respectively different component color passbands and a corresponding plurality of interleaved sets of conducting signal strips registered therewith, and a collector for electrons of said beam returning from said target; means for deriving a composite signal from said collector including a brightness signal component and a color informative modulated carrier; means for deriving respective individual reference signals from each of said signal strip sets, each of said individual reference signals comprising a signal of said carrier frequency of a respectively different phase; means for combining said individual reference signals to obtain an output reference signal of said carrier frequency in a predetermined one of said different phases; and means coupled to said composite signal deriving means for utilizing said output reference signal to obtain said color information from said modulated carrier.

4. A color television pickup system comprising in combination a color pickup tube including an electron target structure comprising a plurality of interleaved sets of optical filter strips having respectively different component color passbands and a corresponding plurality of interleaved sets of conducting strips respectively associated with said filter strip sets, means for generating an electron beam, means for scanning said target structure with said electron beam, and means for developing a composite signal including information relative to the different color components of a subject image in response to said scanning; means for deriving respective individual reference signals from each of said conducting strip sets, each of said individual reference signals comprising a signal of said carrier frequency and of a respectively different color-indicative phase; means including delay apparatus coupled to all but one of said conducting strip sets for combining all of said individual reference signals to obtain an output reference signal of said carrier frequency in a phase corresponding to the color indicative phase of the individual reference signal derived from said one strip set; and means coupled to said signal combining means and responsive to said composite signal for utilizing said reference output signal to derive information relative to a predetermined one of said different color components from said composite signal.

5. A color television pickup system comprising in combination a color pickup tube including means for developing a scanning beam of electrons, a target structure for said scanning beam including a plurality of sets of interleaved optical filter strips having respectively different component color passbands and a corresponding plurality of sets of interleaved conducting signal strips respectively associated with said filter strip sets, and a collector for electrons of said beam returning from said target; means for deriving a composite signal from said collector, said composite signal including signal components representative of the brightness of a subject image and a modulated carrier component bearing information relative to the different color components of said image; means for deriving respective individual reference signals from each of said signal strip sets, each of said individual reference signals comprising a signal of said carrier frequency of a respectively different phase; means for combining said individual reference signals to obtain an output reference signal of said carrier frequency in a predetermined one of said different phases; electric bandpass filter means coupled to said composite signal deriving means for separating said modulated carrier from said composite signal; a synchronous detector; means for applying said separated modulated carrier to said synchronous detector; and means for applying said output reference signal to said synchronous detector to recover information relative to one of said different color components of said image from said modulated carrier.

6. A color television pickup system in accordance with claim 5 wherein said signal combining means includes means for delaying all of said individual reference signals but one, said one individual reference signal having said predetermined one of said different carrier frequency phases.

References Cited in the file of this patent

UNITED STATES PATENTS

| | | |
|---|---|---|
| 2,734,938 | Goodale | Feb. 14, 1956 |
| 2,763,714 | Weimer | Sept. 18, 1956 |